United States Patent [19]

Niemann et al.

[11] 4,270,405

[45] Jun. 2, 1981

[54] STEERING MECHANISM WITH TIME DERIVATION

[75] Inventors: Klaus Niemann, Welzheim; Helmut Wulf, Ostfildern; Peter Hauck, Stuttgart, all of Fed. Rep. of Germany

[73] Assignee: Daimler-Benz Aktiengesellschaft, Stuttgart, Fed. Rep. of Germany

[21] Appl. No.: 38,278

[22] Filed: May 11, 1979

[30] Foreign Application Priority Data

May 11, 1978 [DE] Fed. Rep. of Germany ....... 2820563

[51] Int. Cl.³ .................. B62D 1/20; B62D 5/06; F16H 1/45
[52] U.S. Cl. .................. 74/499; 74/424.8 B; 91/391 R; 188/282; 188/305
[58] Field of Search .................. 74/424.8 R, 496, 497, 74/498, 499, 500; 188/282, 302, 305, 317, 319; 91/391 R

[56] References Cited

U.S. PATENT DOCUMENTS

| 1,710,861 | 4/1929 | Chryst | 188/305 |
|---|---|---|---|
| 1,855,921 | 4/1932 | McNab | 188/305 |
| 3,084,566 | 4/1963 | Pistillo | 188/319 X |
| 4,067,247 | 1/1978 | Niemann et al. | 74/499 |

*Primary Examiner*—Allan D. Herrmann
*Attorney, Agent, or Firm*—Craig and Antonelli

[57] ABSTRACT

A steering mechanism with time derivation wherein a servo member dependent upon an angular velocity of a steering wheel is connected in the manner of a gear system by means of a summing gear mechanism with a servo member dependent on an angle of the steering wheel turn and also with a servo member dependent on an angle of the wheel turn of steered vehicle wheels. A gear element of the summing gear mechanism pertaining to the servo member dependent on the angular velocity is supported toward a housing by way of a resilient support. The servo member dependent on the angular velocity is positively turned off with respect to its action on the summing gear mechanism if the steering wheel angle exceeds a specific limiting angle.

15 Claims, 3 Drawing Figures

STEERING MECHANISM WITH TIME DERIVATION

The present invention relates to a steering mechanism and, more particularly, to a steering mechanism with time rate or derivative action for vehicles, especially motor vehicles, wherein a servo member dependent upon an angular velocity of a steering wheel is connected in the manner of a gear system by means of a summing gear mechanism with a servo member dependent on the angle of the steering wheel turn and also with a servo member dependent on the angle of the wheel turn of the steered vehicle wheel, and wherein a gear element of the summing gear mechanism pertaining to the servo member dependent on the angular velocity is supported toward a housing by way of resilient supporting means.

In U.S. Pat. No. 4,067,247, a steering mechanism of the aforementioned type is proposed which includes a first adjusting member having an adjusting path dependent on the wheel deflection angle which is coupled with the steered vehicle wheels, a second adjusting member with an ajusting path dependent on an angle of the steering wheel deflection which is coupled with this steering wheel and a third adjusting member having an adjusting path dependent on an angular velocity of the steering wheel deflection which is coupled with the steering wheel by way of a mechanism producing an adjusting magnitude dependent on the angular velocity of the steering wheel deflection whereby the second adjusting member is gearingly connected without interposition of any elastic means with the steering wheel as also with the two other adjusting members by way of a summation gear.

The aim underlying the present invention essentially resides in providing a steering mechanism which avoids undesirably large wheel angles of the steered vehicle wheels in case of rather rapid and rather extensive steering motions of the steering wheel.

According to advantageous features of the present invention, the servo member dependent on the angular velocity of the steering wheel is constructed as an adjusting sleeve and is positively turned off with respect to its action on the summing gear mechanism if the steering wheel angle exceeds a specific limiting angle or stroke.

In accordance with the steering mechanism of the present invention, the proportion of the wheel angle of the steered vehicle wheels dependent on the angular velocity of the steering wheel is equal to zero, if a predetermined limiting angle is exceeded during the turning of the steering wheel. In this manner, the derivative function can be advantageously limited to a zone of the central positions of the steering wheel so that a more rapid response of the steering mechanism remains ensured by the derivative action; whereas, undesirably large wheel angles of the steered vehicle wheels are avoided in case of rapid movements of the steering wheel.

Advantageously, according to the present invention, it is possible to operate the steering mechanism with longer damping or shock absorbing strokes or displacement due to the restricted, now relatively small rotary angle region of the steering wheel wherein derivative action occurs by means of higher translations between the rotary angle of the steering wheel and the damping stroke. This is advantageous in being able to keep the disturbance of the dependency of the damping force on the angular velocity of the steering wheel at a small value which disturbance is due to an inward spring deflection of the resilient supporting means.

In the steering mechanism of the present invention, the servo member dependent on the angular velocity of the steering wheel can be shut off, for example, in a simple and advantageous manner by allowing the damping force to move toward zero when the limiting angle has been exceeded.

It is also possible in accordance with the present invention to shut off such servo member in a steering mechanism such as proposed in the aforementioned United States Patent with a shutting off then being effected by placing engaging or mating members out of engagement when the limiting angle has been exceeded.

In accordance with additional features of the present invention, the servo member dependent on the angular velocity is in operative connection with one of two damping elements relatively displaceable with respect to each other, pertaining to a damping means yielding a damping resistance dependent on the relative speed of the damping elements. The other damping element is connected with the gear member, executing linear motions, of a converter gear mechanism for converting a rotary motion into a linear motion. The gear member of the converter gear mechanism executing rotary motions being connected for rotation with the steering wheel and the gear member of the converter gear mechanism executing linear motions is supported nonrotatably against a housing by way of shape-mating engagement members. The engagement members formed as, for example, spline teeth come out of engagement when the limiting angle or stroke is exceeded.

In a steering mechanism wherein an adjusting sleeve, dependent upon the angular velocity and centrally arranged with respect to a steering spindle nonrotatably joined to the steering wheel, is immovably connected in the directions of the steering spindle axis with a bushing which is also centrally arranged with respect to the steering spindle axle, according to additional advantageous features of the present invention, wherein the bushing and the adjusting sleeve may be arranged in series in the directions of the steering spindle axis and the resilient supporting means such as a supporting spring may be arranged structurally as well as operatively between the steering spindle or spline shaft and the adjusting sleeve so as to result in a constructionally advantageous arrangement.

Moreover, a simple and compact structure which is short in the direction of the steering spindle axis is advantageously obtained for a steering mechanism such as proposed in the aforementioned United States Patent by connecting the bushing of the summing gear mechanism to the inner cylinder with the gear member formed, for example, as an adjusting ring, executing linear motions of the converter gear mechanism for converting the rotary motions of the steering wheel or steering spindle into linear motions being connected to the outer cylinder of an annular damping means which is arranged centrally to the steering spindle axis. An annular piston may be immovably fixed in position with respect to one of the two cylinders with the annular piston being disposed between the outer and inner cylinders.

Advantageously, in accordance with the present invention, a preassembled module which is adapted to be inserted between the steering wheel and steering gear may be realized in a steering mechanism wherein the bushing of the summing gear mechanism is engaged by the spline shaft, essentially nonrotatably with respect to the steering wheel, in a nonrotatable fashion, but in a movable manner in the direction of the steering spindle axis with the bushing being further engaged by the gear shaft, essentially immovably fixed with respect to a steering worm of a steering gear mechanism, which engagement being such that there is movability by a threaded engagement, by supporting the spline shaft in a cylindrical steering column jacket mounted at the housing of the steering gear mechanism or servo steering mechanism centrally to the steering spindle axis.

With the converter gear mechanism for converting the rotary motions of the steering wheel into linear motions including a bushing immovably joined to the steering wheel, which bushing is connected threadedly movably with an adjusting ring supportable toward a housing in a nonrotatable fashion but movable in the directions of the steering spindle axis, in accordance with further advantageous features of the present invention, the bushing of the converter gear mechanism may be rotatably supported in the steering column jacket and immovably supported in the directions of the steering spindle axis with the adjusting ring engaging into an axial spline serration at an inner circumference of the steering column jacket.

With the steering mechanism fashioned in accordance with the present invention as a module which can be preassembled, a short structure in the directions of the steering spindle axis is advantageously attained by providing that the outer cylinder extends over the bushing of the converter gear system and is immovably clamped on the adjusting ring.

For the same purpose, it is also advantageous in the steering mechanism constructed in accordance with the present invention as a preassembled module to provide that the engagement members of the bushing of the summing gear system, cooperating with the gear shaft and with the spline shaft, are disposed approximately in an axial zone of the inner cylinder.

By rigidly connecting the steering worm and the gear shaft in a steering mechanism adapted to be constructed as a preassembled module, in accordance with the present invention, special second bearing points for the damper and the gear shaft oppositely to the cylindrical steering column jacket are no longer necessary.

For the same reason, in accordance with still further features of the present invention, the gear shaft and the spline shaft are mutually centered by way of a centering pin with the steering mechanism fashioned as a module which is adapted to be preassembled.

Accordingly, it is an object of the present invention to provide a steering mechanism for motor vehicles which avoids, by simple means, shortcomings and disadvantages encountered in the prior art.

Another object of the present invention resides in providing a steering mechanism which minimizes if not avoids undesirable large wheel angles of steered vehicle wheels.

A further object of the present invention resides in providing a steering mechanism which ensures a more rapid response by way of a derivative action.

Yet another object of the present invention resides in providing a steering mechanism which minimizes damping or disturbances on the steering wheel.

A still further object of the present invention resides in providing a steering mechanism which is compact and may be readily fashioned as a module which is capable of being preassembled.

Another object of the present invention resides in providing a steering mechanism which is readily adapted to be inserted between a steering wheel and a steering gear.

A still further object of the present invention resides in providing a steering mechanism for vehicles which is simple in construction and therefore relatively inexpensive to manufacture.

Another object of the present invention resides in providing a steering mechanism for motor vehicles which functions reliably under all operating conditions.

These and other objects, features and advantages of the present invention will become more apparent from the following description taken in connection with the accompanying drawings which show, for the purposes of illustration only, one embodiment in accordance with the present invention, and wherein.

Figures 1, 1A:
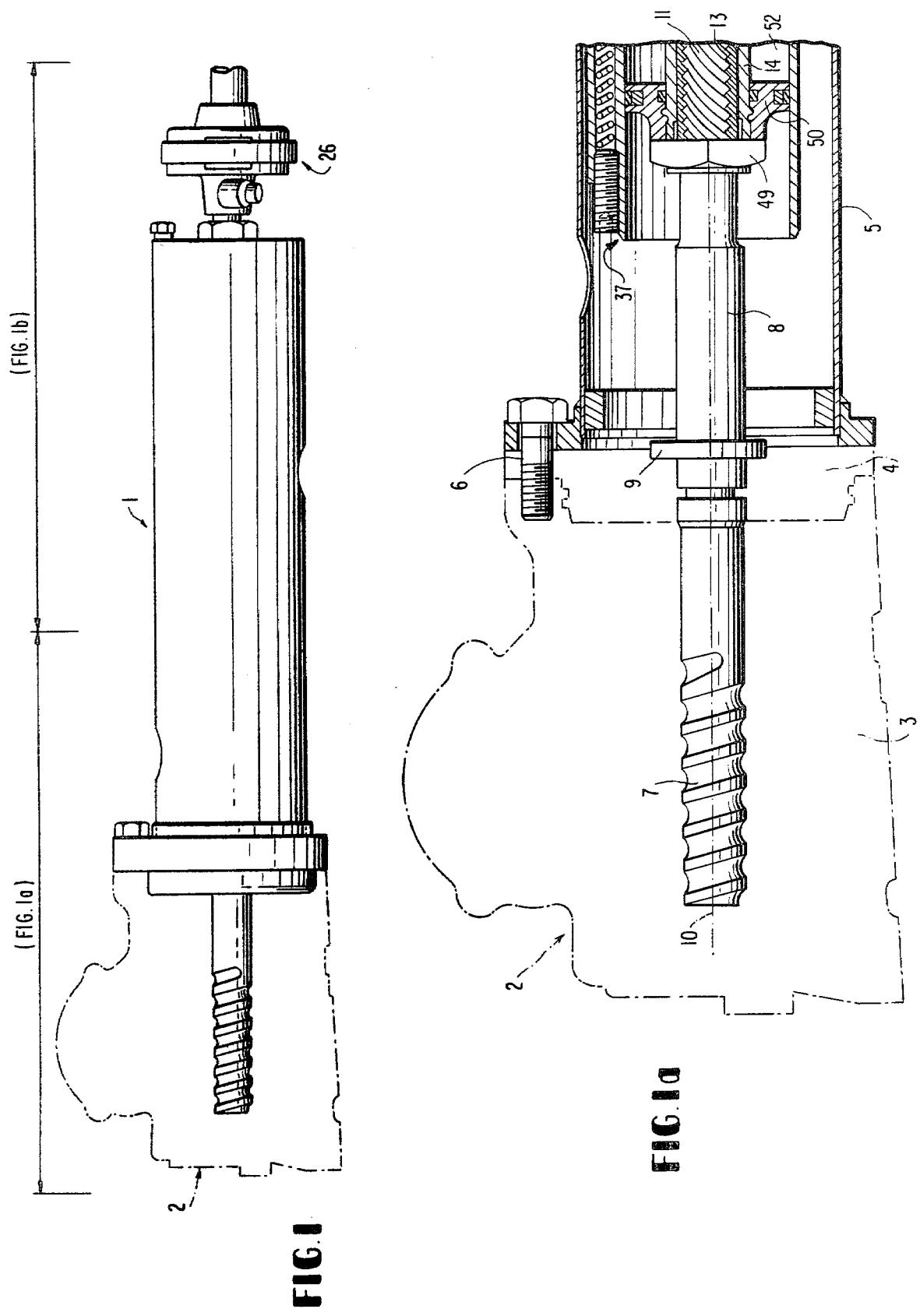
FIG. 1 is a partially schematic plan view of a steering mechanism in accordance with the present invention interposed between a servo steering means and an elastic steering coupling.
FIG. 1a is an axial cross sectional view of the portion of the steering mechanism of FIG. 1 to the left of the line designated FIG. 1a—1a in FIG. 1.

Referring now to the drawings wherein like reference numerals are used throughout the various views to designate like parts and, more particularly, to FIG. 1, according to this Figure, a steering mechanism generally designated by the reference numeral 1 is adapted to operate in conjunction with a conventional servo steering device generally designated by the reference numeral 2 such as disclosed in, for example, Offenlegungsschrift No. 1,940,490. The servo steering device 2 includes a housing 3 constructed as a pressure medium cylinder for a working piston (not shown) and, for this purpose, the housing 3 is provided with a mounting bore for accommodating the working piston which bore is adapted to be sealed pressure-tight by a housing lid 4 (FIG. 1a). The housing lid 4 being attached together with a cylindrical steering column jacket 5 to the housing 3 by means of suitable fasteners such as bolts 6. A steering worm 7 is adapted to be connected to a working piston of the servo steering device 2 in a threadably movable fashion.

As shown in FIG. 1a, the steering worm 7 includes a section 8 having a bearing collar 9 which section penetrates the housing lid 4 toward the outside into the steering column jacket 5. The steering worm 7 is supported by way of the section 8 with the bearing collar 9 within the housing lid 4 so as to be rotatable therein but fixed in the direction of the steering worm axis designated 10—10. The end of the steering worm 7 disposed in the steering column jacket 5 is constructed as a gear shaft with splined teeth 12 (FIG. 1b) having a helical configuration. A corresponding inner spline serration 13 (FIG. 1a) is provided on a bushing 14 with the spline serration 13 being adapted to mesh with the spline teeth 12. The bushing 14 is provided with another internal spline serration 15 which extends in parallel to the axis 10—10. The internal spline serration 15 is engaged by a corresponding spline serration 16 of a spline shaft 17.

Figure 1B:
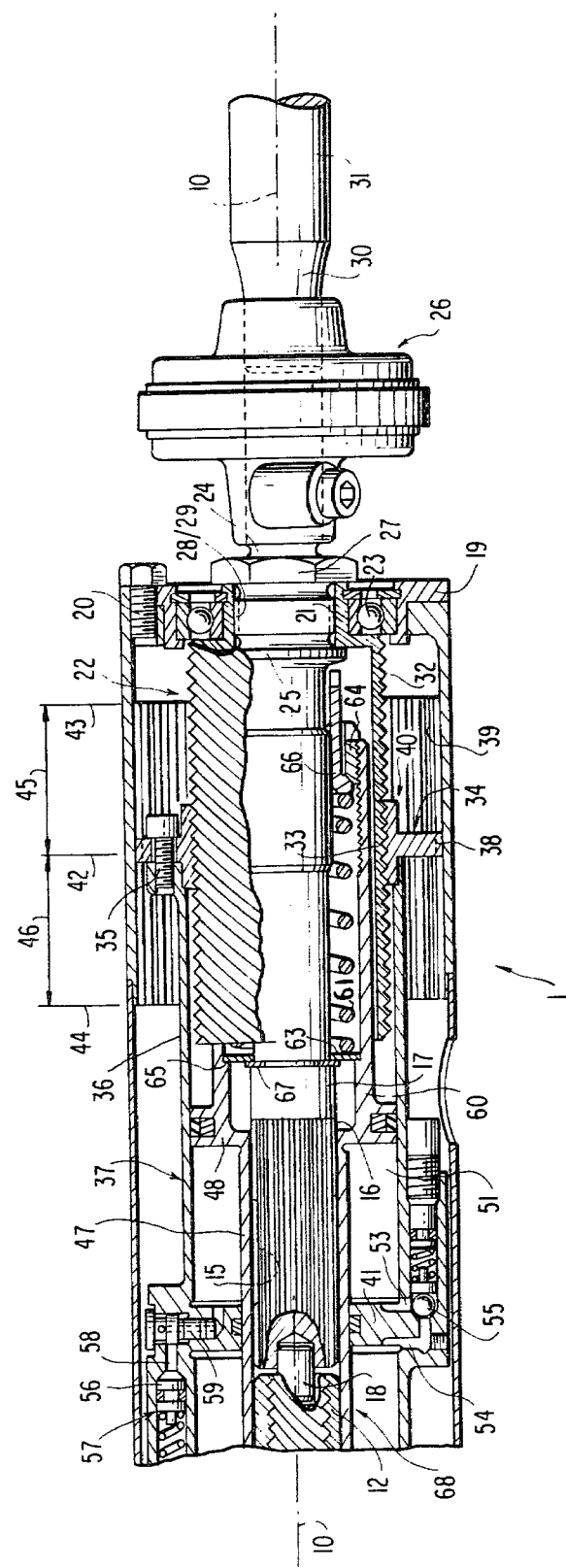
FIG. 1b is an axial cross sectional view of a portion of the steering mechanism of FIG. 1 to the right of the line FIG. 1b—1b in FIG. 1.

As shown in FIG. 1b, the gear shaft 11 and the spline shaft 17 are mutually centered at their adjacent ends by means of a centering pin 18. An annular bearing cap 19, fixed in place by means of fasteners such as bolts 20, is inserted in an end aperature of the steering column jacket 5 disposed opposite the housing lid 4 so that a bearing neck 21 of a bushing 22 is supported in the steering column jacket 5 by an antifriction bearing 23 so as to be rotatable but immovable in the directions of the axis 10—10. The bearing neck 21 and end journal 24 of the spline shaft 17 penetrating the bearing neck 21 are mutually joined by means of a shaft collar 25 and a counter nut 27 in the directions of the axis 10—10 as well as in the peripheral direction by means of corresponding spline teeth 28, 29.

The end journal 24 is connected by means of an elastic steering clutch 26 with an end journal 30 of a steering spindle generally designated by the reference numeral 31 so that the journals rotate together. The steering spindle 31 can be operated in the usual manner by means of a steering wheel (not shown) operatively connected thereto.

An adjusting ring generally designated by the reference numeral 34 is provided which includes a spline serration 33 adapted to engage a helical spline serration 32 on the outer periphery of the bushing 22 with the serration 32 having a higher pitch than the spline teeth 12, 13 provided on the gear shaft 11 and bushing 14. The adjusting ring 34 is fixedly connected by suitable fasteners such as screws or bolts 35 to an outer cylinder 36 of an annular-hydraulic damping means generally designated by reference numeral 37. By means of corresponding spline teeth 38, 39 on the outer periphery of the adjusting ring 34 and on an inner wall surface of the steering column jacket 5, extending in parallel to the axis 10—10, the adjusting ring 34 is mounted to the steering column jacket 5 so as to be nonrotatable but movable axially in the direction of the axis 10—10.

The bushing 22 and the adjusting ring 34 constitute a converter system generally designated by the reference numeral 40 for converting rotary motions of the steering spindle 31 into linear motions of an annular damping piston 41 arranged at the inner circumference of the outer cylinder 36. The adjusting ring 34 assumes the indicated neutral position 42 if the steering spindle 31 is in a central position for straight-ahead driving of the vehicle. If the steering spindle 31, during a turning of the steering wheel, exceeds a certain limiting angle, then the adjusting ring 34 is deactivated either in the shutoff position designated 43 or the shutoff position designated 44 because the spline teeth 38, 39 come out of engagement, whereby the damping means 37 becomes ineffective.

The adjusting ring 34 has a stroke or displacement 45 or 46 between the neutral position 42 and the respective shutoff positions 43 or 44. The stroke 45 or 46 corresponds to a limiting angle of the steering wheel and/or of the steering spindle 31. Once the limiting angle is exceeded, the derivative action is cut off at the respective steering angle. An outer shell of the bushing 14 constitutes an inner cylinder 47 of the damping means 37. The damping means 37 is defined in one direction of the axis 10—10 by a radial end wall 48 of the bushing 14 and in an opposite direction by a flange sleeve 50 threadedly connected to the bushing 14 and secured by a counter nut 49.

An interior space of the damping means 37 is divided into two damping chambers 51 (FIG. 1b) and 52 (FIG. 1a). The two damping chambers 51, 52 are adapted to be placed in communication with each other by way of ducts 53, 54 provided in the annular piston 41. The ducts 53, 54 communicate with each other by way of spring-loaded damping valves 55.

To compensate for temperature-dependent volume changes of the hydraulic damping means 37, the damping chambers 51, 52 are each in communication with a separate compensating chamber generally designated by the reference numeral 57 under the effect of a spring-loaded compensating piston 56.

To avoid for a falsification of damping characteristics of the damping means 37 by the compensating chamber 57, a relatively long and narrow throttling duct 59 is inserted in a hydraulic connection 58 of each compensating chamber 57 with its associated damping chamber 51. The compensating chamber associated with the damping chamber 52 is offset in a peripheral direction of the axis 10—10 with respect to the compensating chamber 57 and thus is not in the plane of the drawings.

An adjusting sleeve 60, disposed at a radial play and concentrically to the spline shaft 17, is constructed integrally with the end wall 48 and supported with respect to the spline shaft 17 in both directions of the axis 10—10 by means of a cylindrical supporting spring 61. The ends of the supporting spring 61 respectively rest on annular spring plate 62 and 63 with each of the spring plates 62, 63 cooperating with stops 64, 65, respectively of the adjusting sleeve 60 as well as with a stop 66 and 67, respectively, of the spline shaft 17.

The gear shaft 11, the bushing 14, and spline shaft 17 constitute a summing gear mechanism generally designated by the reference numeral 68 by way of which a steering angle dependent on the angular velocity is superimposed on the steering angle of the steering wheel and/or steering spindle 31 at the steering worm 7. The rotary angular velocity of the steering wheel and/or steering spindle 31 is converted by way of the converter gear system 40 into a proportional damping force in the damping means 37. At the supporting spring 61 the damping force triggers a spring displacement proportional to the damping force and thus to the steering velocity which displacement is superimposed, as a speed-dependent component by way of the helical gear means 12, 13 of the gear shaft 11 and the bushing 14, on the rotary angle of the spline shaft 17 dependent on the angle of the steering turn at the steering wheel and/or steering spindle 31.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. A steering mechanism with time-rate action which includes a summing gear means for operatively connecting a servo means dependent upon an angular velocity of a steering spindle means with a servo means dependent upon an angle of turning of the steering spindle and with a servo means dependent upon an angle of turning of steered vehicle wheels, and a resilient supporting means for supporting a gear member of the summing gear means associated with the servo means dependent upon the angular velocity, characterized in that means are provided for positively turning off the servo means dependent upon the angular velocity with respect to the summing gear means if the steering spindle means is turned through an angle greater than a predetermined limiting angle.

2. A steering mechanism according to claim 1, characterized in that a converter gear means is operatively connected to the steering spindle means for converting rotary motion into linear motion, the converter gear means includes at least one first gear means connected to the steering spindle means and adapted to be rotated thereby, and at least one further gear means adapted to execute linear motions, and in that shape-mating engagement means are provided for nonrotatably supporting said further gear means relative to a housing means, said shape-mating engagement means being adapted so as to become disengaged upon an exceeding of the predetermined limiting angle.

3. A steering mechanism according to claim 2, characterized in that said shape-mating engagement means includes spine means provided on said further gear member and the housing means.

4. A steering mechanism according to claim 3, characterized in that damping means are provided and include two damping elements mounted so as to be displaceable with respect to each other, one of said damping elements providing a damping resistance independence upon a relative speed of the two damping elements, the servo means dependent upon the angular velocity is operatively connected with said one of said damping elements, the other of said damping elements is connected with said further gear means adapted to execute linear motions.

5. A steering mechanism according to one of claims 2 or 4, characterized in that the servo means dependent upon the angular velocity includes adjusting sleeve means centrally arranged with the steering spindle means nonrotatably joined to a steering wheel, the summing gear means includes a bushing means centrally arranged with respect to the steering spindle means and is connected with the adjusting sleeve means so as to be fixed in directions along the spindle axis of the steering spindle means, the adjusting sleeve means and the bushing means are disposed in series along the axis of the steering spindle means, and in that the resilient supporting means includes a supporting spring means arranged structurally and operatively between the steering spindle means and the adjusting sleeve means.

6. A steering mechanism according to claim 5, characterized in that the bushing means includes an outer shell forming an inner cylinder means of the damping means, the further gear means of the converter gear means includes an adjusting ring, the damping means includes an outer annular cylinder means and an annular piston means disposed between the inner and outer cylinder means, and in that the annular piston means is immovably fixed in position with respect to one of the cylinder means.

7. A steering mechanism according to claim 6, characterized in that the bushing means is engageable with a spline shaft means essentially nonrotatably with respect to the steering spindle means, the bushing means is mounted so as to be nonrotatable with respect to the spline shaft means but displaceable in a direction of the axis of the steering spindle means, a gear shaft means is essentially immovably fixed with respect to a steering worm of a steering gear mechanism, the bushing means being engageable with the gear shaft means so as to enable movement by a threaded engagement, and in that the housing means includes a cylindrical steering column jacket means mounted at a housing of the steering gear mechanism, the spline shaft means being supported in the cylindrical steering column jacket means centrally with respect to the axis of the steering spindle means.

8. A steering mechanism according to claim 7, characterized in that the first gear means of the converter gear means includes a further bushing means immovably joined to the steering spindle means, thread means for connecting said further bushing means with said adjusting ring means for permitting relative movement therebetween, the adjusting ring means is mounted so as to be nonrotatable but axially displaceable relative to the further bushing means, the further bushing means is rotatably supported in the steering column jacket means and immovably supported in the direction of the axis of the steering spindle means, and in that the shape-mating engagement means includes axially extending spline serrations provided at an inner circumference of the steering column jacket means cooperable with splined serrations provided on said adjusting ring means.

9. A steering mechanism according to claim 8, characterized in that the outer cylinder means extends over said further bushing means, and means are provided for immovably fixing the outer cylinder means to the adjusting ring means.

10. A steering mechanism according to claim 9, characterized in that further shape-mating engagement means are provided for mounting the bushing means of the summing gear means so as to be nonrotatable with respect to the spline shaft means and for forming the threaded engagement between the bushing means and said gear shaft means, and in that said further shape-mating engagement means are disposed approximately in an axial zone of the inner cylinder means.

11. A steering mechanism according to claim 10, characterized in that means are provided for rigidly connecting the gear shaft means to the steering worm.

12. A steering mechanism according to claim 11, characterized in that a centering pin means is provided for centering the gear shaft means relative to the spline shaft means.

13. A steering mechanism according to claim 6, characterized in that the outer cylinder means extends over said further bushing means, and means are provided for immovably fixing the outer cylinder means to the adjusting ring means.

14. A steering mechanism according to claim 7, characterized in that further shape-mating engagement means are provided for mounting the bushing means of the summing gear means so as to be nonrotatable with respect to the spline shaft means and for forming the threaded engagement between the bushing means and said gear shaft means, and in that said further shape-mating engagement means are disposed approximately in an axial zone of the inner cylinder means.

15. A steering mechanism according to claim 7, characterized in that a centering pin means is provided for centering the gear shaft means relative to the spline shaft means.

* * * * *